US008677755B2

(12) United States Patent
Bulin et al.

(10) Patent No.: US 8,677,755 B2
(45) Date of Patent: Mar. 25, 2014

(54) METHOD FOR CONTROLLING THERMAL EFFLUENTS GENERATED BY AN AIRCRAFT AND COOLING DEVICE FOR AN AIRCRAFT IMPLEMENTING SAID METHOD

(75) Inventors: Guillaume Bulin, Blagnac (FR); Jan Dittmar, Buxtehude (DE)

(73) Assignees: Airbus Deutschland GmbH, Hamburg (DE); Airbus Operations S.A.S., Toulouse (FR)

(*) Notice: Subject to any disclaimer, the term of this patent is extended or adjusted under 35 U.S.C. 154(b) by 985 days.

(21) Appl. No.: 12/742,937

(22) PCT Filed: Nov. 12, 2008

(86) PCT No.: PCT/FR2008/052028
§ 371 (c)(1),
(2), (4) Date: May 14, 2010

(87) PCT Pub. No.: WO2009/068807
PCT Pub. Date: Jun. 4, 2009

(65) Prior Publication Data
US 2010/0288244 A1    Nov. 18, 2010

(30) Foreign Application Priority Data
Nov. 14, 2007   (FR) ...................................... 07 59043

(51) Int. Cl.
*F02C 7/224*  (2006.01)
(52) U.S. Cl.
USPC .......................... 60/736; 60/39.83; 244/135 R
(58) Field of Classification Search
USPC ................... 60/267, 39.281, 734, 736, 39.83; 244/118.5, 135 R, 53 R, 57, 117 A
See application file for complete search history.

(56) References Cited

U.S. PATENT DOCUMENTS

| 4,104,873 | A | * | 8/1978 | Coffinberry | ................ 60/39.281 |
| 4,273,304 | A | * | 6/1981 | Frosch et al. | ............. 244/117 A |
| 4,741,152 | A | | 5/1988 | Burr et al. | |
| 4,776,536 | A | | 10/1988 | Hudson et al. | |
| 6,182,435 | B1 | * | 2/2001 | Niggemann et al. | ............ 60/772 |
| 7,478,525 | B2 | * | 1/2009 | Iya et al. | ......................... 60/204 |

FOREIGN PATENT DOCUMENTS

| EP | 1 557 357 | 7/2005 |
| WO | 02/16743 | 2/2002 |

OTHER PUBLICATIONS

International Search Report dated Oct. 21, 2009, from corresponding PCT application.

* cited by examiner

*Primary Examiner* — Andew Nguyen
(74) *Attorney, Agent, or Firm* — Young & Thompson (57) ABSTRACT

A process for management of thermal effluents of an aircraft that includes an airframe (110) and at least one propulsion system (112), whereby the at least one propulsion system (112) includes a gas turbine engine (116) that is supplied with fuel via a fuel supply circuit (122) that extends from a reservoir (124) that is arranged at the airframe (110), whereby the airframe (110) includes at least one source of thermal effluents (134), wherein the process includes at least partially dissipating—at the level of at least one propulsion system (112)—the thermal effluents that are generated at the airframe (110) by using as coolant the fuel that is used for supplying the gas turbine engine (116).

5 Claims, 6 Drawing Sheets

METHOD FOR CONTROLLING THERMAL EFFLUENTS GENERATED BY AN AIRCRAFT AND COOLING DEVICE FOR AN AIRCRAFT IMPLEMENTING SAID METHOD

This invention relates to a process for management of thermal effluents generated by an aircraft and a cooling device of an aircraft that allows the implementation of said process.

Figure 1:
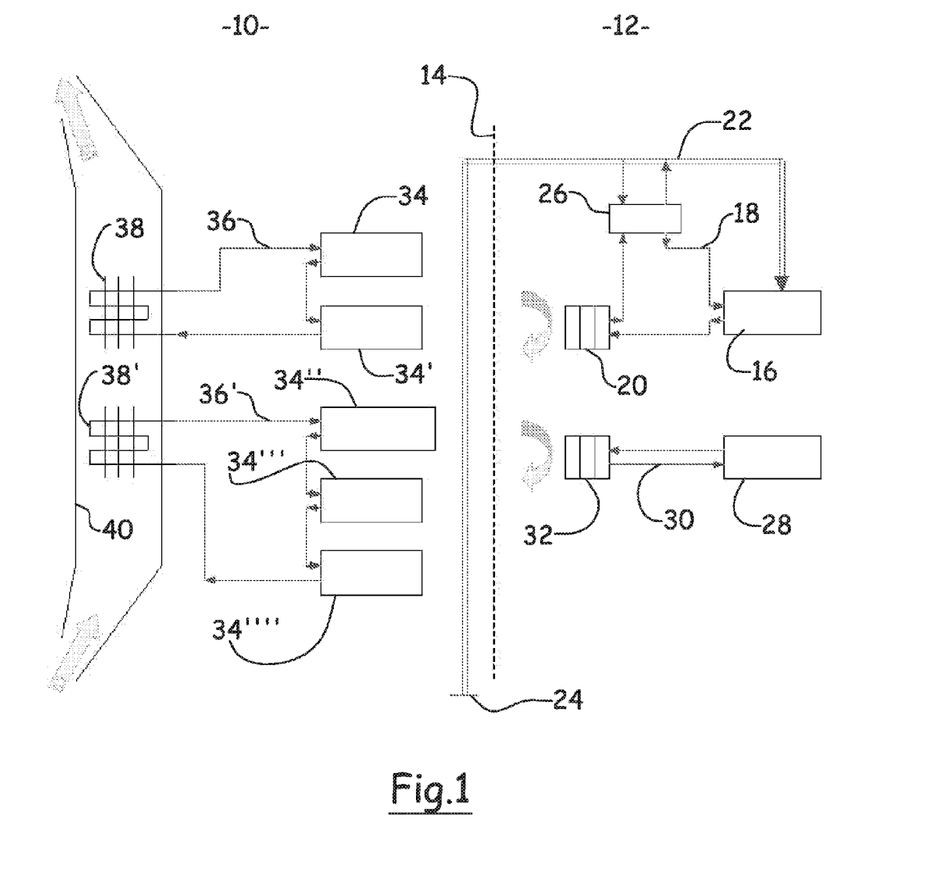
FIG. 1 is a diagram that illustrates a cooling device of an aircraft according to the prior art.

An aircraft comprises an airframe and at least one propulsion system. FIG. 1 diagrammatically shows an airframe at 10 and a propulsion system at 12.

An airframe is broadly defined as all of the elements of the aircraft, in particular the fuselage, the wings, and the tail unit, with the exception of propulsion systems.

According to a widely used embodiment, a propulsion system is suspended under a wing by means of a mast. More generally, the propulsion system is connected to the airframe by means of an interface 14 that is indicated by dotted lines in FIG. 1.

A propulsion system 12 comprises a gas turbine engine 16 that is equipped with a first engine cooling circuit 18, in which a coolant, in particular oil, circulates, passing through a first air/oil engine exchanger 20.

The gas turbine engine is supplied with fuel by means of a fuel circuit 22 that extends from a reservoir 24 that is arranged at the airframe. In some cases, it is possible to use several cooling sources to cool the oil of the gas turbine engine, for example by using a second oil/fuel exchanger 26 at the level of the first engine cooling circuit 18 and by using the fuel as a coolant so as to cool the oil of the gas turbine engine.

In addition, the propulsion system 12 can comprise another source 28 of thermal effluents, for example one or more electric generators installed close to the gas turbine engine.

So as to optimize the operation of these elements 28, it is necessary to regulate their temperatures by means of a second engine cooling circuit 30, in which a coolant that passes through a third engine exchanger 32, in particular an oil/air exchanger, circulates.

The characteristics of each engine cooling circuit, namely the characteristics of the fluid to be cooled, for example its flow rate, the characteristics of the exchanger, for example its dimensions, and the characteristics of the fluid that is used for cooling, for example its flow rate, are adjusted based on the requirements for regulation of the temperature at the source, in particular so as to keep the temperature of the source below a certain threshold.

In the case of the first engine cooling circuit, these requirements vary according to the operation of the aircraft and are more significant when the aircraft is on the ground. Thus, the characteristics of the engine cooling circuit relative to the gas turbine engine are determined based on the most significant restraints when the aircraft is on the ground.

The airframe 10 also comprises at least one source of thermal effluents 34, and in general several, for example, electrical accessories 34, electronic power systems 34', an air-conditioning system 34'', avionics 34''', and client equipment 34''''. All of these elements are to be temperature-regulated to ensure their operation and to guarantee the highest availability rate. For this purpose, at least one airframe cooling circuit 36 is provided. According to the illustrated example, the airframe comprises two airframe cooling circuits 36, 36', each comprising an exchanger 38, 38' that makes it possible to cool the coolant that circulates in each of the circuits; these exchangers use air for cooling the coolant that circulates in the cooling circuit.

The characteristics of each airframe cooling circuit, namely the characteristics of the fluid to be cooled, for example its flow rate, the characteristics of the exchanger, for example its dimensions, and the characteristics of the fluid that is used for cooling, for example, its flow rate, are adjusted based on the requirements for regulation of the temperature at the source, in particular so as to keep the temperature of the source below a certain threshold.

For the airframe cooling circuits, these requirements vary according to the operation of the aircraft and are more significant when the aircraft is in flight.

Thus, the characteristics of the airframe cooling circuit(s) are determined based on the most significant constraints when the aircraft is in flight.

It is noted that the cooling requirements for the propulsion systems and the airframe vary based on flight and are not necessarily the most restrictive at the same time.

Thus, the air channels 40 that are used for conveying air to the exchangers 38, 38' of the airframe are sized for the most restrictive flight phases, namely the take-off, cruising, and landing phases that are not the most restrictive phases for the propulsion systems.

The exchangers 20, 32, 38, 38' are installed in cooling channels 40 or on the surface of certain parts of the aircraft, for example on the level of the nacelles of the propulsion systems. However, since they interfere with the aerodynamic flows, these exchangers are detrimental in terms of aerodynamic drag of the aircraft, which affects the energy consumption of the propulsion systems.

In terms of aircraft design, the components of the airframe and the components of the propulsion systems are segregated for safety reasons. Actually, it is necessary to ensure that a malfunction that appears at the level of the airframe and that disrupts the operation of the propulsion systems is extremely improbable.

According to another constraint, a mast that forms the interface between the airframe and a propulsion system is a very complex subassembly whose dimensions are the smallest possible so as to reduce its influence on the aerodynamic characteristics of the aircraft. Consequently, the addition of other elements in addition to existing elements in this zone is almost impossible without altering the dimensions and increasing the influence of the mast on the aerodynamic characteristics of the aircraft. In addition, this addition would have the result of complicating the process of assembly and disassembly of the propulsion system, which would prove detrimental for the maintenance of the aircraft.

Also, the purpose of this invention is to eliminate the drawbacks of the prior art by proposing a process for managing the thermal effluents of an aircraft whose purpose is to improve the performance levels of the aircraft without altering the rules of segregation and without complicating the general structure of the aircraft.

For this purpose, the invention has as its object a process for managing the thermal effluents of an aircraft that comprises an airframe and at least one propulsion system, whereby said at least one propulsion system comprises a gas turbine engine that is supplied with fuel via a fuel supply circuit that extends from a reservoir that is arranged at the level of the airframe, whereby said airframe comprises at least one source of thermal effluents, characterized in that it consists in at least partially dissipating—at the level of at least one propulsion system—the thermal effluents that are generated at the airframe by using as coolant the fuel that is used to supply the gas turbine engine.

The invention makes it possible to pool the cooling means that are provided at the airframe and at least one propulsion system while at the same time complying with the rules of segregation and not complicating the interface between the airframe and the propulsion systems. This pooling makes it possible to reduce the characteristics of cooling circuits at the level of the airframe and more particularly exchangers at the level of said airframe, which makes it possible to improve the aerodynamic characteristics of the aircraft and to reduce its energy consumption.

Other characteristics and advantages will emerge from the following description of the invention, a description that is provided only by way of example, with regard to the accompanying drawings, in which.

As indicated above, an aircraft comprises an airframe and one or more propulsion systems.

An airframe is defined in the broad sense as all of the elements of the aircraft, in particular the fuselage, the wings, and the tail unit, with the exception of propulsion systems.

FIGS. 2 to 6 diagrammatically show a part of the aircraft corresponding to the airframe at 110, and a propulsion system at 112. The other propulsion systems are not shown and are generally identical.

According to a widely used embodiment, a propulsion system is generally suspended under a wing by means of a mast. However, the invention is not limited to this embodiment and covers all of the variants that relate to the connection between the propulsion system and the airframe. Hereinafter, the interface between the airframe 110 and the propulsion system 112 is referenced 114 and is shown in dotted lines.

The same elements as in the prior art are referenced in the same manner as in FIG. 1 by having added 100.

Figure 2:
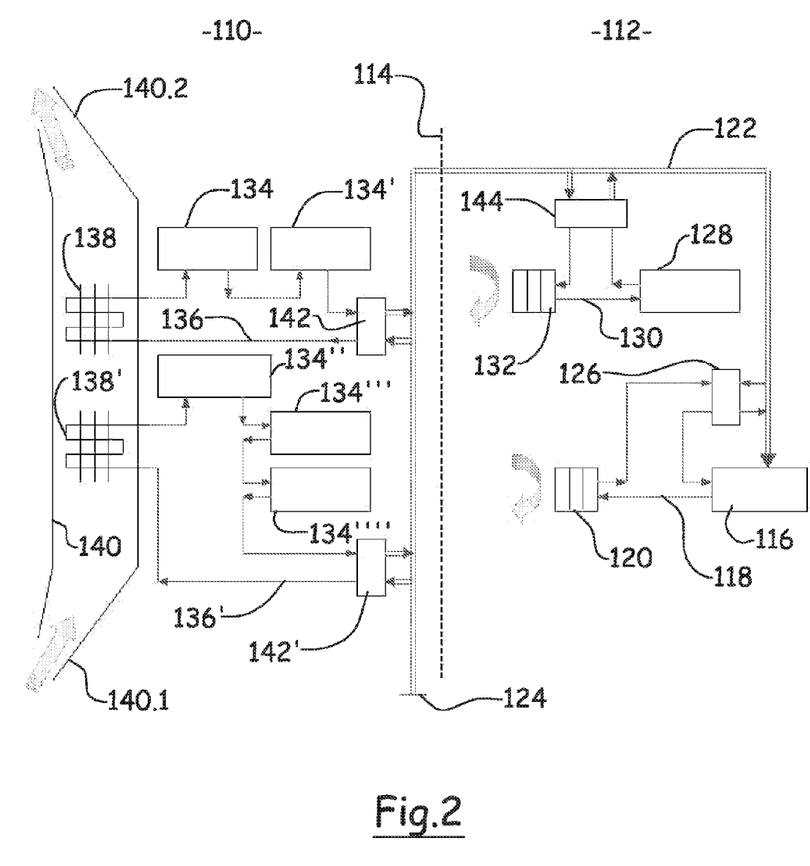
FIG. 2 is a diagram that illustrates a cooling device of an aircraft according to the invention.

A propulsion system 112 comprises a gas turbine engine 116 that is equipped with a first engine cooling circuit 118, in which a coolant, in particular oil, circulates, passing through a first air/oil engine exchanger 120.

The gas turbine engine 116 and the exchanger 120 are shown in the shape of a rectangle and are not presented in more detail because they are known to one skilled in the art.

Likewise, the cooling circuit also is not presented in more detail because it is also known to one skilled in the art.

The gas turbine engine is supplied with fuel by means of a fuel circuit 122 that extends from a reservoir 124 that is arranged at the level of the airframe.

As for the other elements, the fuel circuit and the reservoir are not presented in more detail because they are known to one skilled in the art.

In some cases, it is possible to use at least one other cooling source for cooling the oil of the gas turbine engine 116. As illustrated, a second oil/fuel exchanger 126 is provided at the level of the first engine cooling circuit 118. In this case, the fuel is used as a coolant so as to cool the oil of the gas turbine engine 116. According to this mode of operation, the temperature of the fuel is to remain below a certain threshold, in accordance with rules of certifications and recommendations of manufacturers so as to ensure optimum operation of the gas turbine engine.

In addition, the propulsion system 112 can comprise at least one other source 128 of thermal effluents, for example one or more electrical generators that are installed close to the gas turbine engine 116.

So as to optimize the operation of this source of thermal effluents 128, it is necessary to regulate its temperature by means of a second engine cooling circuit 130 in which a coolant that passes through a third engine exchanger 132, in particular an oil/air exchanger, circulates.

The exchangers 120 and 132 that are provided at the level of the propulsion system are generally of the surface type and are arranged at the level of the aerodynamic surface of the propulsion system, for example at the level of the outside surface of the nacelle of the propulsion system. However, the invention is not limited to this embodiment. Thus, according to other variants, the exchangers could be arranged in one or more channels that range from an intake for collecting air to a discharge for expelling air. In all of the cases, the exchangers interfere with the air flows and have an influence on the aerodynamic characteristics of the aircraft.

The cooling requirements of the gas turbine engine or other sources vary based on flight phases. In the case of the gas turbine engine, this requirement is most significant when the aircraft is on the ground. Consequently, the characteristics of the first engine circuit 118, and more particularly of the exchanger 120, are determined when the aircraft is on the ground, which corresponds to the flight phase during which the requirements are the most significant. Consequently, the cooling capacities of the first engine circuit 118, and more particularly those of the exchanger 120, are not fully exploited during the other phases of flight, in particular during the take-off, cruising, and landing phases. It is the same for the second engine cooling circuit 130 and the exchanger 132.

The airframe 110 comprises at least one source of thermal effluents 134, and in general several, for example electrical accessories 134, electronic power systems 134', air-conditioning system 134", avionics 134''', and client equipment 134''''. These thermal effluent sources are provided by way of example and are not limiting.

All of these elements that constitute thermal effluent sources are to be temperature-regulated to ensure their operation and to guarantee the highest availability rate. For this purpose, at least one airframe cooling circuit 136 is provided. According to the illustrated example, the airframe 110 comprises two airframe cooling circuits 136, 136', each comprising at least one exchanger 138, 138' that makes it possible to cool the coolant that circulates in the corresponding circuit.

According to one embodiment, the coolant that circulates in the airframe cooling circuits 136, 136' is oil, and the exchangers 138, 138' are oil/air-type plate exchangers, arranged in at least one channel 140 that ranges from an intake 140.1 for collecting air to a discharge 140.2 for expelling air. However, the invention is not limited to this embodiment. Thus, the exchangers could be of the surface type and could be arranged at the level of the aerodynamic surface of the airframe. Regardless of the configuration, the exchangers interfere with the air flows and have an effect on the aerodynamic characteristics of the aircraft.

The cooling requirements of the thermal effluent sources 134 of the airframe vary based on flight phases. In general, the cooling requirement of said sources 134 is the most important when the aircraft is in flight, in particular during take-off, cruising, and landing phases.

Contrary to the prior art, the characteristics of the airframe cooling circuit(s) 136, 136', and more particularly of the exchanger(s) 138, 138', are not determined based on the most significant requirements when the aircraft is in flight.

According to the invention, the process for managing thermal effluents of an aircraft consists in at least partially dissipating—at the level of at least one propulsion system 112—the thermal effluents that are generated at the level of the airframe 110 by using, as coolant, the fuel that is used to supply the gas turbine engine 116. For this purpose, the cooling device of the aircraft comprises at least one exchanger 142 at the level of at least one airframe cooling circuit 136 that makes it possible to transfer heat from the coolant of the airframe cooling circuit 136 to the fuel.

Hereinafter, the exchanger(s) 142 is/are called interface exchangers 142. According to a preferred embodiment, each airframe cooling circuit 136, 136' comprises an interface exchanger 142, 142'. Even if the drawings show only one propulsion system, the invention can be applied to all of the propulsion systems of an aircraft. Thus, the amount of heat that is obtained from the airframe can be dissipated in several propulsion systems that makes it possible to reduce the amount of heat dissipated by each of the propulsion systems.

Furthermore, whereby the flow rate of fuel during take-off, cruising, and landing phases is very clearly greater than the flow rate when the aircraft is on the ground, it is possible to dissipate a larger amount of heat during these phases without causing excessive temperature elevation of the fuel.

According to the invention, it is possible to reduce the dimensions of the oil/air exchangers that have an influence on the aerodynamic characteristics, the dimensions of the channel(s) 140), as well as the flow rate of the air that circulates in said channels, which makes it possible to reduce the influence of the cooling device on the aerodynamic characteristics of the aircraft and therefore the energy consumption of the aircraft. Furthermore, even if the addition of an interface exchanger 142 leads to increasing the on-board weight, the increase in terms of energy consumption that comes from the improvement of the aerodynamic characteristics of the aircraft is to a large extent greater than the loss that comes from this addition of on-board weight.

According to another advantage of the invention, no new fluid circuit is provided between the airframe and a propulsion system, which makes it possible to comply with the principle of segregation and to not complicate the interface between the airframe and the propulsion system.

According to the invention so that the fuel temperature does not exceed a certain threshold at the level of the gas turbine engine 116, the engine cooling circuit 118 comprises an oil/fuel exchanger 126 that makes it possible to cool the fuel by transferring the heat from the fuel in the direction of the coolant of the engine cooling circuit 118. Thus, contrary to a use according to the prior art, the exchanger 120 does not ensure a heat transfer only from the coolant of the circuit to the fuel but also from the fuel to the coolant of the cooling circuit 118 during certain phases of flight. The amount of heat collected by the coolant of the engine cooling circuit 118 is then dissipated in the exchanger 120, which, according to the prior art, is not fully exploited during the phases of flight, in particular during the take-off, cruising, and landing phases.

According to one variant, the other engine cooling circuits 130 can comprise a fuel oil-type exchanger 144 to ensure the transfer of an amount of heat from the fuel to the coolant of the engine cooling circuit 130, whereby the latter is not fully exploited according to the prior art during the phases of flight, in particular during the take-off, cruising, and landing phases. The addition of an exchanger that does not have influence on the aerodynamic characteristics of the aircraft makes it possible to globally reduce the consumption of the aircraft despite the increase in the on-board weight.

Thus, according to the invention, it is possible to pool the exchangers that are used for the cooling of the airframe and the propulsion system(s) and to create a synergy between them that makes it possible to optimize their dimensions and more particularly those of the exchangers that are arranged at the airframe, whereby a portion of the amount of the heat that is not dissipated by said exchangers arranged at the airframe is dissipated in the gas turbine engine(s) and/or in the exchanger(s) arranged at the level of the propulsion system(s). This solution also makes it possible to optimize the yield of exchangers provided at the level of the propulsion systems, whereby the latter are used more than, according to the prior art, during the phases of flight (take-off, cruising, landing) for collecting the heat of the fuel and dissipating it.

This configuration that makes it possible to obtain an increase in terms of energy consumption complies with the rules of segregation between the airframe and the propulsion systems and does not complicate the interface between the airframe and the propulsion systems, whereby no new circuit is provided between the airframe and the propulsion systems.

Such pooling is more particularly advantageous within the framework of a so-called "more electric" aircraft structure that provides for air conditioning that is done using electric compressors whose electric machines and associated power electronics systems have to be cooled, and heat pumps from which it is necessary to evacuate the collected thermal power.

Figure 3:
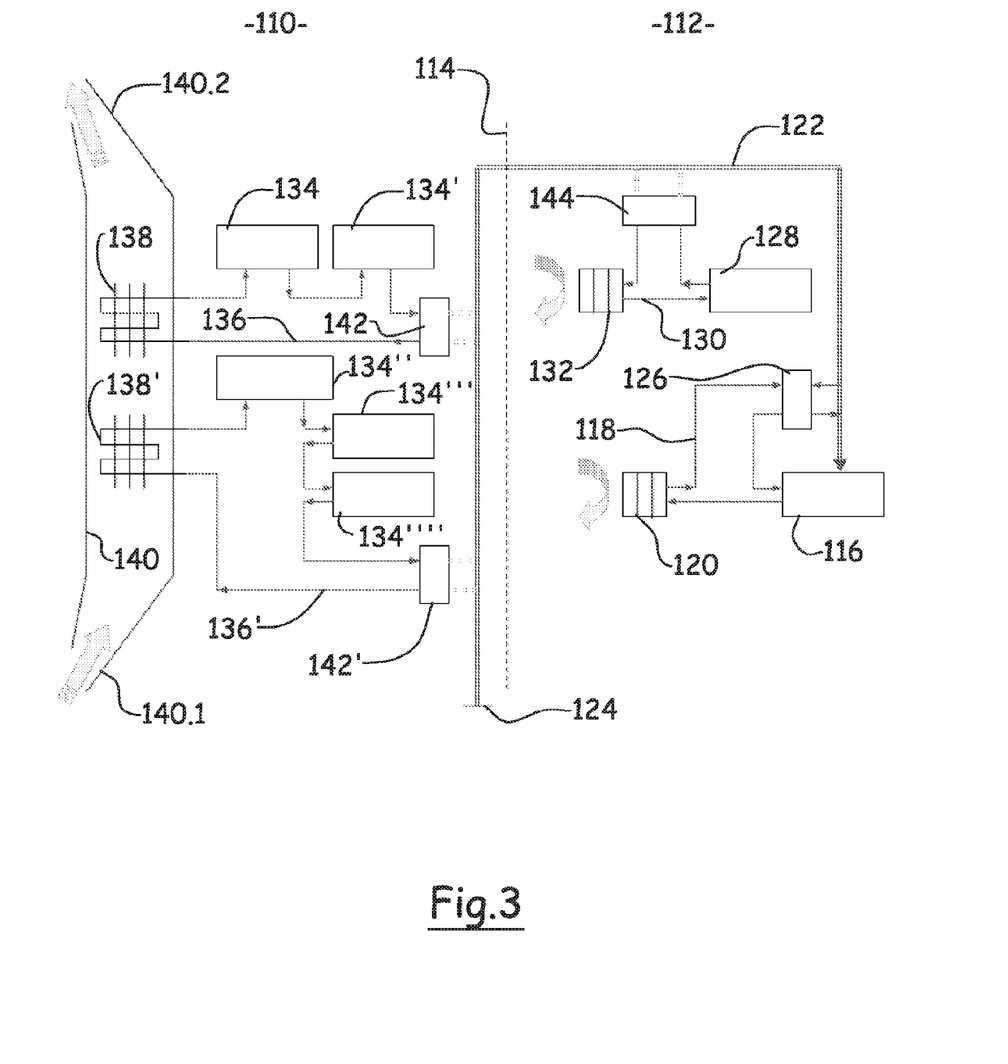
FIG. 3 is a diagram that illustrates a cooling device of an aircraft according to the invention during the operational phases on the ground.
Figure 4:
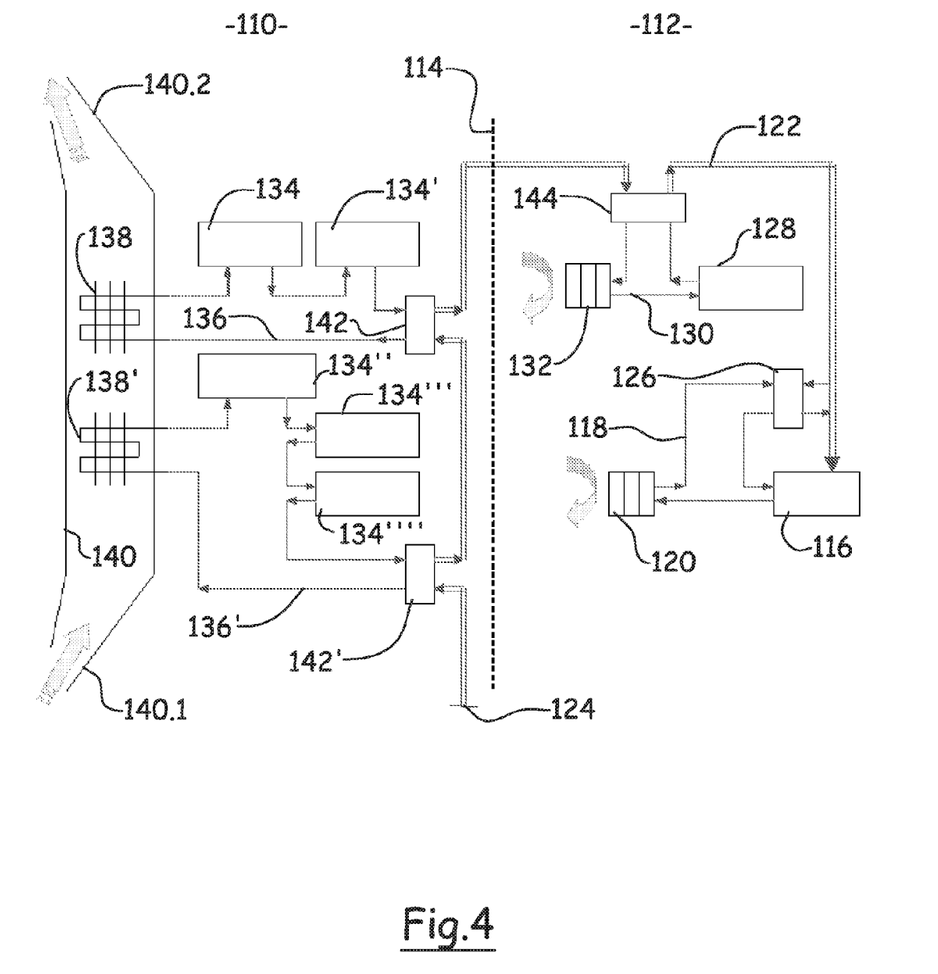
FIG. 4 is a diagram that illustrates a cooling device of an aircraft according to the invention during the operational phases in flight.
Figure 5:
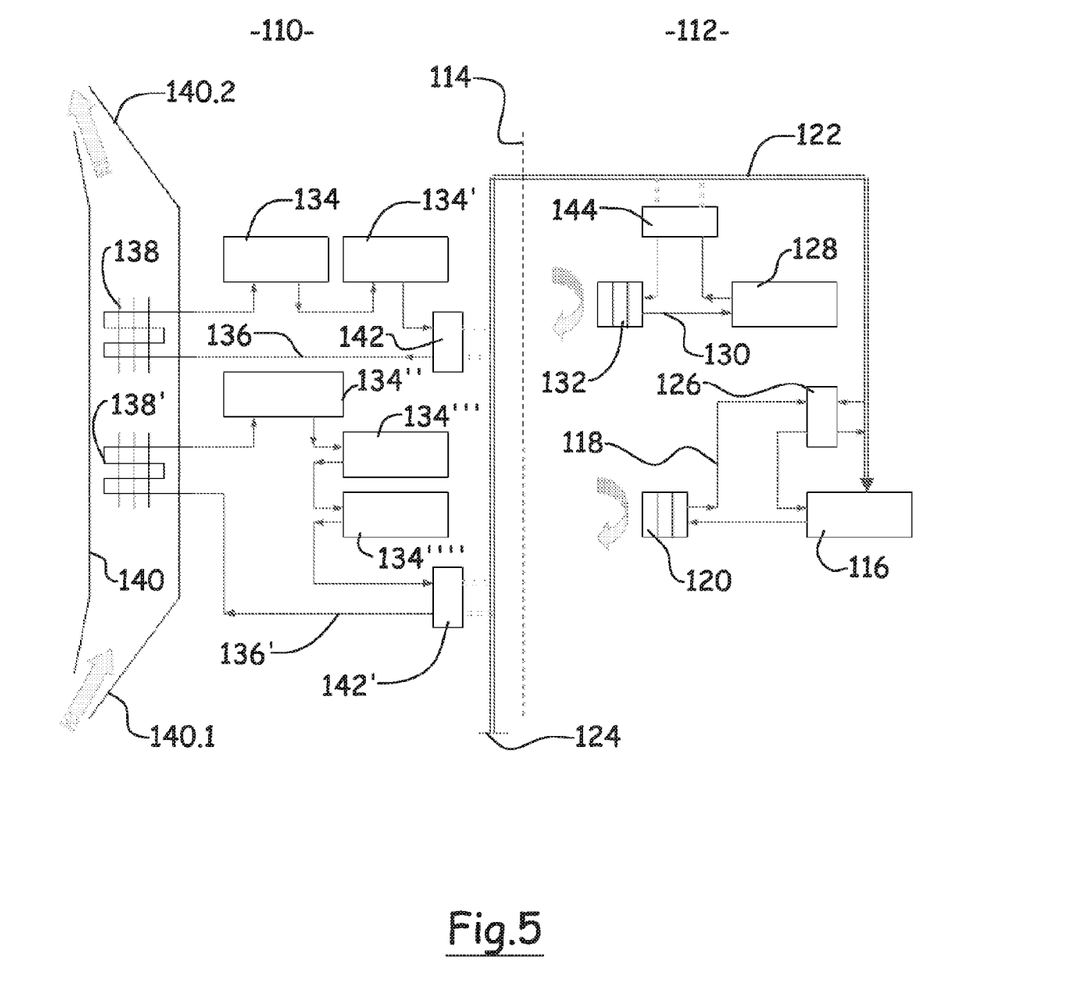
FIG. 5 is a diagram that illustrates a cooling device of an aircraft according to the invention in the case of a malfunction.

The operating principle is now described with regard to FIGS. 3 to 5.

In FIG. 3, the cooling device is illustrated when the aircraft is on the ground.

All of the cooling capacities for each of the propulsion systems are used, whereby this phase of flight on the ground corresponds to the dimensioning point of the cooling circuits of the propulsion systems.

During this flight phase, the entire amount of heat produced by the equipment of the airframe is dissipated at the level of the airframe in the exchangers 138 and 138' that are placed in the cooling channel 140 of the airframe. The interface exchangers 142, 142' are not activated.

In FIG. 4, the cooling device is illustrated when the aircraft is in flight.

With the exchanger 120 and the optional exchanger 132 not being sized for these flight phases, there are unexploited cooling capacities at the level of the propulsion system(s). During these flight phases, the exchangers 142, 142' are activated. Thus, an amount of heat of the airframe cooling circuit(s) 136, 136' is collected at the level of said exchangers 142, 142' by the fuel.

The latter conveys this amount of heat up to the level of the propulsion system(s) where it is dissipated at the level of the gas turbine engines 116 and/or collected at the exchanger 126 and the optional exchanger 144 by a coolant to be dissipated at the level of the exchanger 120 and the optional exchanger 132 that are then used optimally, which makes it possible to reduce the heat dissipation requirements at the level of the airframe and helps to reduce the size of the exchangers 138 and 138', without significantly altering the structure of the aircraft, in particular at the airframe/propulsion system interface, while improving the aerodynamic characteristics of the aircraft and reducing its energy consumption.

The exchangers 120 and 132 make it possible to limit the temperature of the fuel that supplies the gas turbine engines 116.

FIG. 5 shows the device in the case of malfunction during a flight phase, on the ground or in flight.

The cooling device comprises means for measuring and monitoring for making it possible to verify its proper operation, in particular the capacity of the engine cooling circuit to cool the fuel before its intake into a gas turbine engine.

Thus, as soon as a failure that affects the cooling capacity of a propulsion system is detected, the means for measuring and monitoring immediately interrupt the operation of the interface exchangers 142, 142' and isolate the fuel circuit 122 from the airframe cooling circuits 136, 136'. Thus, the transfer of heat in the direction of the fuel is stopped. In this case, the thermal effluents at the airframe are to be limited because the cooling capacity of the airframe is less than the maximum requirements, by making the systems of the airframe operate in a degraded mode by, for example, limiting the power of the air conditioning, by limiting the electrical consumption of the client equipment, . . . .

Figure 6:
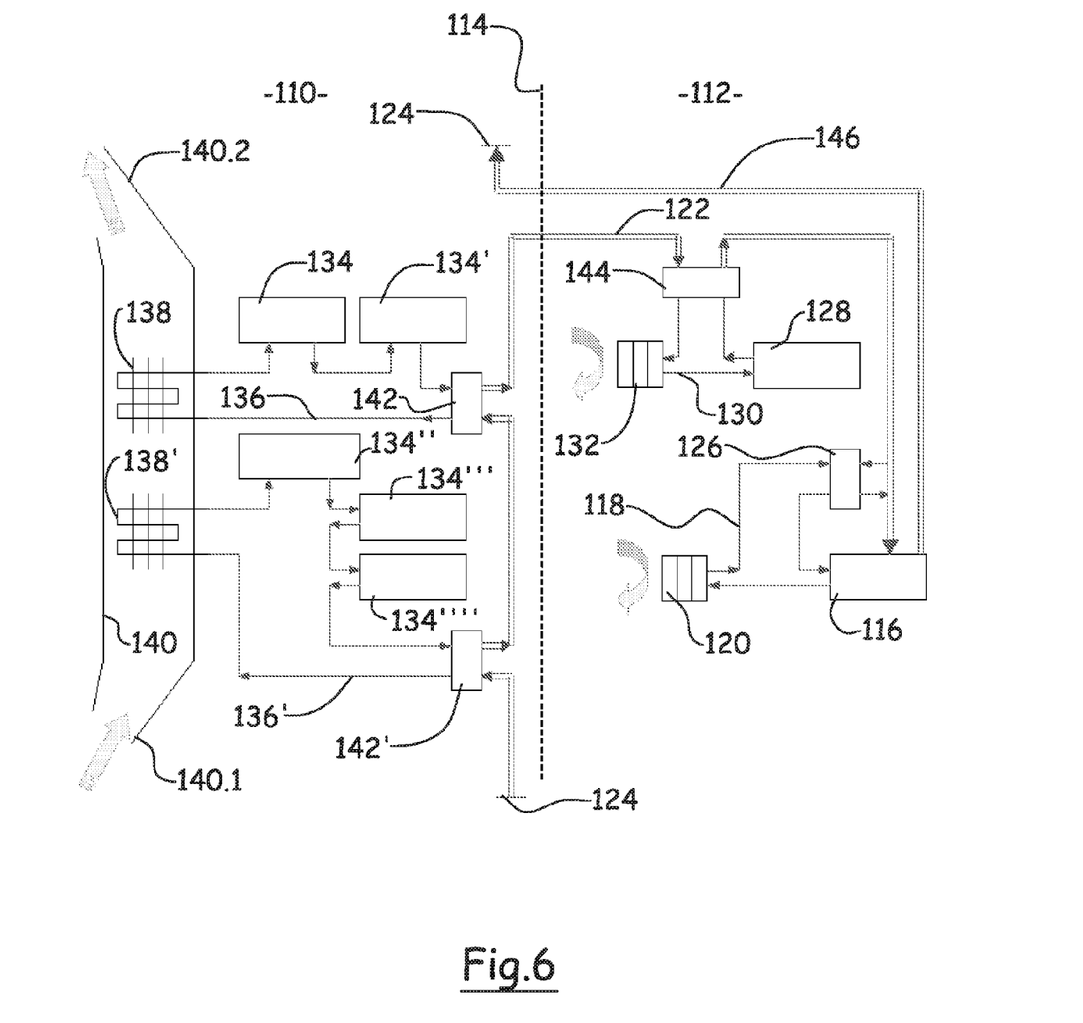
FIG. 6 is a diagram that illustrates a cooling device of an aircraft according to another variant of the invention.

FIG. 6 shows a variant of the invention. According to the variants illustrated above, the amount of heat that can be transported by the fuel is limited by the maximum allowable temperature of the fuel (imposed by the rules of certification and by engine limitations) as well as by the flow rate of fuel linked to the fuel consumption of the propulsion system. According to the variant that is illustrated in FIG. 6, it is possible to increase the amount of heat that is conveyed by the fuel by increasing the flow rate of the fuel using a return circuit 146 of the fuel to the reservoir 124 that makes it possible to return to the reservoir the amount of fuel that is greater than the requirement of the gas turbine engine.

This return circuit 146 can comprise means for pumping, filtering, and regulating the flow rate.

According to this embodiment, the amount of heat is no longer limited.

The invention claimed is:

1. A process for management of thermal effluents of an aircraft that comprises an airframe and at least one propulsion system, wherein the at least one propulsion system includes a gas turbine engine that is supplied with fuel via a fuel supply circuit that extends from a reservoir that is arranged at the airframe, and at least one engine cooling circuit that includes a first air/oil engine exchanger for evacuating calories from the gas turbine engine, and wherein the airframe includes at least one source of thermal effluents, the process comprising using the fuel that is flowing to the gas turbine engine to at least partially dissipate at the at least one propulsion system the thermal effluents that are generated by the at least one source of thermal effluents in the airframe, wherein at least a portion of the heat from the at least one source of thermal effluents in the airframe and that is conveyed by the fuel flowing to the gas turbine engine is collected by the coolant of said at least one engine cooling circuit and dissipated by the first air/oil engine exchanger so as to keep the temperature of the fuel flowing to the gas turbine engine below a certain threshold; and the process further comprising isolating the fuel flowing to the gas turbine engine from the at least one airframe cooling circuit when a failure at the level of the at least one engine cooling circuit is detected.

2. The process for management of thermal effluents of an aircraft according to claim 1, the process further comprising increasing the amount of heat that is conveyed by the fuel by increasing the flow rate of the fuel flowing to the gas turbine engine.

3. A cooling system for an aircraft that includes an airframe and at least one propulsion system, the at least one propulsion system including a gas turbine engine that is supplied with fuel via a fuel supply circuit that extends from a reservoir that is arranged at the airframe, and the airframe includes at least one source of thermal effluents, the cooling system comprising:

at least one engine cooling circuit that includes an air/oil engine exchanger for evacuating calories from the at least one propulsion system;

at least one airframe cooling circuit that cools the at least one source of effluents and includes an air/coolant exchanger and a first oil/fuel exchanger that transfers a portion of the heat of the coolant that circulates in said at least one airframe cooling circuit to the fuel flowing to the gas turbine engine and that conveys said heat;

a second oil/fuel exchanger in said at least one engine cooling circuit and that conveys at least a portion of the heat in the fuel flowing to the gas turbine engine to the coolant of said at least one engine cooling circuit where the heat is dissipated via the air/oil engine exchanger; and the system measuring and monitoring to detect a failure at the level of said at least one engine cooling circuit and isolating the fuel flowing to the gas turbine engine from said at least one airframe when the failure is detected.

4. An aircraft that comprises the cooling device according to claim 3.

5. The aircraft according to claim 4, further comprising a return circuit toward the reservoir of unused fuel by said at least one propulsion system that increases the flow rate of fuel channeled to said propulsion system and the heat that is conveyed by said fuel.

* * * * *

UNITED STATES PATENT AND TRADEMARK OFFICE
CERTIFICATE OF CORRECTION

PATENT NO.        : 8,677,755 B2
APPLICATION NO. : 12/742937
DATED             : March 25, 2014
INVENTOR(S)       : Bulin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Twenty-ninth Day of September, 2015

Michelle K. Lee
*Director of the United States Patent and Trademark Office*